United States Patent Office 2,843,556
Patented July 15, 1958

2,843,556

ENHANCING POT LIFE OF POLYMERIZABLE COATING COMPOSITIONS

Robert W. Moorman, Springdale, Pa., assignor to Pittsburgh Plate Glass Company, Allegheny County, Pa., a corporation of Pennsylvania No Drawing. Application May 9, 1955
Serial No. 507,155

12 Claims. (Cl. 260—28.5)

This invention relates to a method of increasing the so-called "pot life" of mixtures of (A) polyesters of dihydric alcohols and dibasic acids, at least a part of which contain polymerizable ethylenic groups and (B) monomers containing $>C=CH_2$ groups; the invention has particular relation to methods of increasing the pot life of mixtures of the foregoing materials when they are used as coating media.

Valuable resins have heretofore been prepared by conjointly polymerizing (A) a liquid or liquefiable polyester of a dihydric alcohol component and a dicarboxylic acid component at least a part of the latter component being reactively ethylenically unsaturated with (B) a monomer containing a $>C=CH_2$ group. In such mixture, the monomer functions initially as a reactive solvent for the relatively viscous polyester. In the subsequent stages of cure, the ethylenic groups of the monomer react by addition with the ethylenic groups of the polyester, thus cross-linking contiguous polyester molecules. Possibly a part of the monomer molecules also react homogeneously with each other. In any event, the monomer is in effect eliminated from the mixture and the latter is converted at moderate temperatures and in the substantial absence of pressure into a thermoset resinous body of good clarity, hardness and resistance to chemicals and solvents.

It is to be recognized that in most instances, the reaction of addition in the polyester-monomer mixture occurs so readily that the mixtures can not be effectively formed and can not be stored for any substantial period of time after formation without a strong tendency for premature gelation. In order to obviate this difficulty, it is customary to add to one or both of the components of the interpolymerizable mixture, certain substances termed inhibitors, which are designed to prevent premature gelation. Substances appropriate for this purpose include phenolic bodies such as hydroquinone, tertiary butyl catechol, 3-isopropyl catechol and the like, as well as quaternary ammonium compounds such as trimethyl benzyl ammonium chloride. These substances effectively prevent gelation during the operation of mixing the components of the copolymerizable mixture and during subsequent stages of storing the latter. When the mixtures containing inhibitors are to be cured, it is customary to incorporate thereinto catalysts of interpolymerization which usually are free radical initiators and being represented by the various peroxides and hydroperoxides, such as benzoyl peroxide, cumene hydroperoxide, t-butyl hydroperoxide and the like.

Systems of the foregoing type embodying polyesters and monomers, together with gelation inhibitors for storage purposes and catalysts added to the mixtures at or near the time of use have enjoyed extensive use in the casting and laminating arts. When such a mixture containing an appropriate catalyst is heated, gelation occurs quite rapidly even in the absence or substantial absence of pressure and the mixtures provide valuable products. More recently the mixtures have been used as coating media for concrete, wood and other structural material. They can be spread as liquid solutions on the surfaces to be coated and within a very short time, the films are converted into hard, thermoset state even at low or moderate temperatures. Conversion to the hardened state is thus attained without the evaporation of solvents, or the oxidational cross-linkings required in many conventional coating materials.

It has been observed that at normal atmospheric temperatures, atmospheric oxygen tends to retard or prevent curing with films of the resinifiable mixtures and for that reason, thin surface films of the mixtures do not cure readily. To correct this tendency waxes such as paraffin or resins such as polyethylene, of limited compatibility with the mixtures have been added to the mixtures in minute amounts. These tend to migrate to the surface of the films, providing exceedingly thin layers that exclude oxygen until after the films have hardened. This technique is elaborated upon in a copending application to Howard L. Gerhart and Gordon J. Mirr, Serial Number 371,312, filed July 30, 1953. However, the catalyzed mixtures in bulk or mass have short "pot life;" that is, they exhibit a very strong tendency to gel prematurely and this tendency can not be corrected by addition of the conventional gelation inhibitors such as hydroquinone without greatly slowing the rate of cure, at least at lower temperatures. Polymerizable mixtures made up with catalyst and ready for application to a surface to be coated would often gel within a few minutes; therefore, the mixtures had to be applied at once after they were made up. Since most coating operations of any appreciable scale require considerable time for completion, the material made up would sometimes set before application could be finished.

This invention is based on the discovery that water can be readily incorporated with the interpolymerizable mixtures of ethylenically unsaturated polyesters and monomers containing $>C=CH_2$ groups in substantial amounts and when so incorporated, it will effectively retard gelation of the mixture, even after catalyst materials, such as benzoyl peroxide or other free radical initiator, have been added. So long as the water is present the gelation reactions in the mixture apparently are inhibited or at least strongly retarded. However, after the mixture containing the water is spread upon a surface in a suitably thin layer, the water evaporates quite rapidly with but little or no impairment of the capacity of the interpolymerizable mixture for curing. The catalyzed mixture, when the water has evaporated, will cure almost as rapidly, if not quite as rapidly as conventional mixtures which have not been treated with water. Films of the mixture will set in a few minutes to a desired hard, thermoset state even though the material in bulk has good pot life. So long as the mixture is maintained in sufficient bulk to prevent or retard the evaporation of water therefrom, gelation is inhibited or at least is greatly retarded so that the pot life of the same is prolonged, often for many hours, thus permitting relatively large batches of the mixtures to be made up, catalyzed and applied without danger of the mixture gelling before application is made.

In considering the basic components of the film forming materials, it is to be recognized that the techniques employed in assembling them is similiar to the prior art. For example:

Interpolymerizable mixtures of polyesters containing ethylenic unsaturation and monomers containing $$>C=CH_2$$

groups are now well recognized compositions and have been extensively disclosed in the literature and the patent arts. Many such interpolymerizable mixtures are disclosed in such patents as Earl E. Parker Patents 2,593,787 and 2,676,947 as well as in many other patents. Interpolymerizable mixtures suitable for use in the practice of the present invention may be employed following the general techniques disclosed in the aforementioned patents.

Polyesters suitable for use as primary ingredients or vehicles in the compositions of this invention may for example comprise as alcoholic components any one of, or a mixture of any two or more of such dihydric alcohols as:

TABLE A

I. Ethylene glycol
II. 1,3-propylene glycol
III. Trimethylene glycol
IV. 1,3-butylene glycol
V. Diethylene glycol
VI. Dipropylene glycol
VII. Polyethylene glycol (usually in admixture with other glycols)

These are reacted by esterification with a dibasic acid (or their anhydrides) or mixture of a plurality of such acids. The acid or some thereof should be alpha or alpha-beta ethylenic. Appropriate unsaturated dibasic acids which may be reacted with glycols or dihydric alcohols selected from Table A are represented by the following table:

TABLE B (a) Maleic acid
(b) Fumaric acid
(c) Itaconic acid
(d) Mesaconic acid
(e) Citraconic acid
(f) Ethyl maleic acid
(g) Diethyl maleic acid It is to be recognized that in the above table, as well as in the examples and other discriptive matter to follow, the term "acid" includes the anhydrides (where the latter exist). Often the anhydride of a dibasic acid is more satisfactory as the starting material than the free acid. Since the polyesters from the dibasic acid anhydrides are the same as those obtained from the free acids, they are to be regarded as being equivalent.

It is often desirable to include with the alpha-beta ethylenic dicarboxylic acid (or anhydride) a substantial amount of an acid (or anhydride) which is free of ethylenic unsaturation or other unsaturation reactive by addition and therefore does not react with monomers. Appropriate acids of this type include:

TABLE C (1) Phthalic acid
(2) Terephthalic acid
(3) Isophthalic acid

Aliphatic dicarboxylic acids such as:

(4) Succinic acid
(5) Adipic acid
(6) Sebacic acid
(7) Azelaic acid

These non-ethylenic dicarboxylic acids tend to reduce the number of ethylenic groups in the polyester chains so that their interpolymers with monomers containing $>C=CH_2$ groups are of greater flexibility and toughness than are obtained from polyesters containing only alpha-beta ethylenically unsaturated dicarboxylic acids. In mixing the acids, substantially any amount of the several acids may be employed, though naturally, as the amount of alpha-beta ethylenic dicarboxylic acid in the polyester is reduced the product tends to approach more and more closely, regular alkyds which are free of ethylenic unsaturation. A proportion of about 0.25 to 12 moles of the non-ethylenic acid per mole of the alpha ethylenic dicarboxylic acid is preferred.

Unsaturated fatty acids such as those from linseed oil or other drying or semi-drying oils may also be utilized as components of the polyester mixture.

The conditions desirable for reaction of the dihydric alcohol component with the dibasic acid component to form a polyester suitable for use in the practice of the present invention is now a well recognized art. Preferably the polyhydric alcohol component is employed in amount slightly in excess of, or at least not below stoichiometric equivalency with respect to the acid or mixture of acids. The mixture of the dihydric alcohol and dibasic acid components is reacted by heating to esterification temperature, preferably in the substantial absence of oxygen. An azeotropic solvent, such as xylene, may be incorporated in the reaction mixture to assist in carrying away the water evolved in esterification. Esterification is continued until water ceases to evolve, or until a satisfactorily low acid number such as 60 or less is attained, or until the polyester is solid or reasonably viscous at room temperature. In no event, is the reaction continued to form an infusible, insoluble product.

The following are some typical polyesters preparable by the preceding techniques and using components selected from those above listed; for purposes of simplification the several components in the polyesters are designated only by their notations as indicated in the Tables A, B and C:

TABLE D

| | Number of Polyester | Alpha Ethylenic Acid (Table B) | Non-Ethylenic Acid (Table C) | Dihydric Alcohol (Table A) |
|---|---|---|---|---|
| Group I | 1' | a | none | II |
| | 2' | b | | II |
| | 3' | c | | II |
| | 4' | d | | II |
| | 5' | e | | II |
| | 6' | f | | II |
| | 7' | g | | II |
| Group II | 8' | a | 1 | II |
| | 9' | a | 2 | II |
| | 10' | a | 3 | II |
| | 11' | a | 4 | II |
| | 12' | a | 5 | II |
| | 13' | a | 6 | II |
| | 14' | a | 7 | II |
| Group III | 15' | a | 1 | III |
| | 16' | a | 1 | IV |
| | 17' | a | 1 | V |
| | 18' | a | 1 | VI |
| | 19' | a | 1 | II |
| Group IV | 20' | b | 1 | II |
| | 21' | b | 2 | II |
| | 22' | b | 3 | II |
| | 23' | b | 4 | II |
| | 24' | b | 5 | II |
| | 25' | b | 6 | II |
| | 26' | b | 7 | II |
| Group V | 27' | a | 1 | II+V |
| | 28' | a | 2 | II+V |
| | 29' | a | 3 | II+V |
| | 30' | a | 4 | II+V |
| | 34' | a | 5 | II+V |
| | 35' | a | 6 | II+V |
| | 36' | a | 7 | II+V |
| Group VI | 37' | b | 1 | II+V |
| | 38' | c | 1 | II+V |
| | 39' | d | 1 | II+V |
| | 40' | e | 1 | II+V |
| | 41' | f | 1 | II+V |
| | 42' | g | 1 | II+V |

The components of any specific polyester in this table can readily be determined by reference to Tables A, B, and C; for example: polyester 1' is the alkyd of propylene glycol and maleic anhydride; polyester 8' is from propylene glycol and a mixture of maleic anhydride and phthalic anhydride (in mixing the acids the non-ethylenic acid may be in proportion of about 0.25 to about 10 moles with respect to the alpha ethylenic acid. This rule may be followed for all mixtures of acids).

It is to be observed that the polyesters in Table D have been divided into groups I to VI. In any group only one component is varied. It is to be understood however, that the component or components in any specific group indicated as being constant may also be varied by selection of any desired corresponding component which in another group or groups is indicated as being variable. For example: in group II, the alpha ethylenic acid, a, may be replaced by any of the alpha ethylenic acids of group VI. The dihydric alcohol II in group II may be replaced by any of the alcohols II, III, IV, V, and VI of group III.

In order to form a thermosetting coating material, a polyester or a mixture of polyesters, such as 1 or more of those above described, is incorporated with a monomer which is liquid, is a solvent for the polyester and contains a terminal $>C=CH_2$ group usually attached to a negative radical. The following constitutes a class from which selection of such monomers may be made:

TABLE E
(1) Vinyl toluene
(2) Styrene
Esters such as:
(3) Vinyl acetate
(4) Allyl acetate
(5) Allyl acrylate
(6) Methyl acrylate
(7) Methyl methacrylate
(8) Diallyl phthalate
(9) Diallyl succinate
(10) Acrylonitrile, and others Appropriate mixtures of polyesters such as any of those prepared in accordance with Table D may be mixed with any of the monomers from Table E. Amounts of monomers may be from about 5 to 50 percent by weight based upon the polyester-monomer mixture.

A number of the possible mixtures of polyesters such as those from Table D and monomers such as those from Table E are tabulated in Table F to follow; in order to conserve space in the table, symbols from the respective Tables D and E are employed to designate the compounds:

TABLE F

| Mixture | Polyester Component | Monomer Component |
|---|---|---|
| A | 1' | 1 |
| B | 1' | 2 |
| C | 1' | 3 |
| D | 1' | 4 |
| E | 1' | 5 |
| F | 1' | 6 |
| G | 1' | 7 |
| H | 1' | 8 |
| I | 1' | 9 |
| J | 8' | 1 |
| K | 8' | 2 |
| L | 8' | 3 |
| M | 8' | 4 |
| N | 8' | 5 |
| O | 8' | 6 |
| P | 8' | 7 |
| Q | 8' | 8 |
| R | 8' | 9 |
| S | | |
| T | 1' | 1 |
| U | 8' | 1 |
| V | 15' | 1 |
| W | 20' | 1 |
| X | 27' | 1 |
| Y | 37' | 1 |
| Z | 2' | 2 |
| AA | 9' | 2 |
| BB | 16' | 2 |
| CC | 27' | 2 |

In order to form interpolymerizable mixtures from polyesters, such as those above described, and monomers, such as those from the foregoing list, it is usually preferable to employ the polyester relatively hot, e. g. at a temperature within a range of about 75° C. to 150° C. and in order to effect mixture of the components at such temperatures without danger of gelation, as well as for purposes of obviating gelation during subsequent storage of the mixture, it is usually desirable to incorporate into the polyester or the monomer a suitable gelation inhibitor. Good examples of such inhibitors are included in the aforementioned Parker patents. The inhibitors may be employed in amounts of about 0.001 to 3 percent by weight based upon the mixtures of polyesters and monomers. The foregoing inhibitors are given merely by way of example. It will be recognized that many of the conventional inhibitors, such as hydroquinone, tertiary butyl catechol and many others may be employed in lieu of the quaternary ammonium compounds or the 3-isopropyl catechol constituting the subject matter of invention in the patents.

As will be apparent from the patents above alluded to, the interpolymerizable mixtures containing appropriate gelation inhibitors are quite stable during any reasonable period of storage. When it is desired to employ such mixtures in conventional laminating or casting operations, it is customary to add a free radical initiator as a catalyst. Appropriate materials are listed in the aforementioned patents and include:

Methyl ethyl ketone peroxide
Benzoyl peroxide
Tertiary butyl hydroperoxide
Cumene hydroperoxide, and many others Appropriate amounts of catalysts for use in the interpolymerizable mixtures are within a range of about 0.01 to 5 percent.

The addition of small amounts of wax to interpolymerizable mixtures to obviate tackiness assumed to be due to the effects of oxygen in curing the films has been alluded to. This same technique may be employed in the practice of the present invention. Various waxy materials may be employed for the purpose, but the hydrocarbon waxes often referred to as mineral waxes, including paraffin, montan, ozocerite and seresin are greatly preferred. Polyethylene, which is a hydrocarbon of high molecular weight may also be included. Certain other waxy materials, such as beeswax, carnauba wax, sugar cane wax and the like, also provide air curing polyester-monomer compositions. Preferably the wax is added to the polyester before the addition of the monomer and at a temperature of about 140° C. It is to be understood that the wax may also be added to the monomer and the resultant mixture added to the polyester at a temperature within a range of about 25° C. to 140° C. When a film of an interpolymerizable mixture of a polyester and a monomer containing such wax is allowed to stand, the wax apparently tends to migrate to the surface thus forming a thin protective film which prevents the retardation of the cross-linking action between the polyester and the monomer owing to the action of atmospheric oxygen.

It will be appreciated that other methods of obviating the retarding action of atmospheric oxygen upon the films may be employed. For example, the films may be coated after application, with a thin film of wax or they may be protected from atmospheric oxygen by coatings of cellophane or by inert gas or by any other convenient technique. When so protected from the retarding effects of oxygen, the films of the interpolymerizable mixture have cold curing characteristics. That is, they may be applied to a surface and will cure to a hard, thermoset state within a relatively short period without application of heat from an external source.

Water may be incorporated in the mixtures of polyesters and monomers for purposes of retarding premature gelation of the catalyzed mixtures in an amount of about 0.5 to 10 or 12 percent by weight based upon the resinifiable components; a preferred amount is about 1 to 5 percent. Possibly traces of water of reaction may remain in the resin from the reaction of esterification, but usually this amount is too low to have any substantial effect upon the gel time of the mixture. This amount is not normally taken into account in adding water for purposes of increasing pot life; usually, the amount of residual water present in commercial resins will not be above about 0.1 percent by weight based upon the polyester. The incorporation of water in adequate amount is readily attained by hand stirring or by mechanical agitation. It has been found that the water may be added either before or after the addition of the catalyst. It may be incorporated at the time the batch is prepared, if so desired. In event that there is a tendency for the water to separate, it may be readily reincorporated into the interpolymerizable mixture merely by stirring at the time the material is to be used.

If desired, the stability of the water-polyester-monomer mixture may be increased by the incorporation of small amounts of emulsifying agents, such as the so-called surfactants, familiar to the art. Appropriate emulsifying agents comprise the commercial product sold as Tween 40 which is understood to be polyethylene sorbitan monopalmitate; Tween 60 which is understood to be a reaction product of sorbitan palmitate and ethylene oxide; Triton–X–200 which is understood to be a sodium salt of an alkyl aryl polyether sulfonate; Emcol–H–77 (manufactured by the Emulsol Corporation), and others.

Interpolymerizable mixtures of polyesters, monomers, gelation inhibitors such as dihydric phenols, water and the usual catalysts may be applied to surfaces of wood, metal, stone, brick, concrete or other materials and after application quick cure is attained, but little if any longer than that from a polymerizable composition which has not been stabilized by the addition of water. Application may be by brush, by roller coater, by spraying, by spreading with a doctor blade, or by other appropriate methods. Cure of the mixtures containing the water often can be attained at room temperature, but may be speeded up by baking, or by irradiation with infrared rays. Flowing of air over the films in order to expedite removal of the water is also contemplated. The preparation of an interpolymerizable mixture suitable for use as a coating medium is illustrated by the following example:

Example I

A polyester containing ethylenic groups distributed along the polyester chain was prepared by the esterification reaction of phthalic acid, which is (1) in Table C in a ratio of 3 moles; maleic acid, which is (a) in Table B in a ratio of 2 moles; propylene glycol, which is (II) in Table A in a ratio of 4.1 moles; and diethylene glycol, which is (V) in Table A in a ratio of 1.4 moles. The mixture was reacted to evolve water. When the reaction was substantially complete, but the product was still fusible and soluble, it was stabilized with hydroquinone. The polyester can be classified under item 27' in Table D. Paraffin wax was added, as was cobalt naphthanate. The mixture was also incorporated with a monomer, namely styrene, to make an interpolymerizable mixture meeting the requirements of CC in Table F. Quantitatively, the composition was as follows:

| | Parts by weight |
|---|---|
| Polyester | 130 |
| Styrene | 70 |
| Hydroquinone | 0.026 |
| Paraffin wax | 0.0626 |
| Cobalt naphthanate | 1.2 |

The mixture was an interpolymerizable composition which would not gel prematurely. The mixture was then pigmented with titanium dioxide and precipitated calcium silicate of fine particle size and a small amount of orthoamyl phenol was added as an anti-skinning agent, the adjustment being to the following constituency:

| | Parts by weight |
|---|---|
| Polyester | 572 |
| Styrene | 317 |
| Titanium dioxide | 123 |
| Calcium silicate | 23 |
| Orthoamyl phenol | 1 |

The composition in the absence of catalyst is relatively stable and may be preserved for long periods of time without premature gelation or skinning.

In order to provide a readily curable composition, 1 milliliter of a 60 percent solution of methyl ethyl ketone peroxide in dimethyl phthalate was added to 50 grams of interpolymerizable mixture; this mixture in the absence of water, has a pot life of about 15 to 20 minutes and has a normal cure time at room temperature of about 30 minutes. The foregoing pot life is relatively short and necessitates the making up of the polymerized mixtures in relatively small batches in order to prevent setting up before the material can be applied to surfaces which are to be coated.

In accordance with the provisions of the present invention, water in varying amounts was incorporated into test samples of the mixture in a range of about 1 to 10 percent by weight based upon the total mixture. It was found that upon the addition of 4 to 5 percent by weight of water, the pot life of the mixture was increased to 3½ to 4 hours. This was adequate to permit preparation of relatively large batches without danger of premature gelation. The water could be added at any stage short of gelation of the mixture.

The mixtures when spread upon a suitable surface, cured at room temperature within a period of 35 to 45 minutes.

In order to increase the stability of emulsification of the mixture of water in the mixture, an emulsifying agent such as the commercial product known as Triton–X–200 which is understood to be a sodium salt of an alkyl aryl polyether sulfonate may be added in small amount, e. g. ¼ to 3 percent by weight based upon the catalyst employed in the reaction. The mixture, however, is useful without emulsifier.

A good method of incorporating the water involves adding it to a mixture of catalyst, using the emulsifier to aid dispersion. This mixture is subsequently incorporated with the resinifiable mixture of polyester and monomer. For example, 100 grams of a 60 percent solution of methyl ethyl ketone peroxide may be mixed with 1 gram of Trion–X–200 and the mixture may be agitated to effect solution. This mixture is then added in desired amount to the interpolymerizable mixture. If greater amount of water is desired in the interpolymerizable mixture than can be incorporated with a requisite amount of catalyst, the amount of water in the catalyst-water mixture can be increased, or more water can be added at any stage to the interpolymerizable mixture.

It will be recognized that in interpolymerizable mixtures containing catalysts and further containing water to increase pot life, segregation of water may take place slowly even though an emulsifier such as Triton–X–200 or the like is present. This, however, is not particularly objectionable since redispersion is readily effected by shaking or otherwise agitating the mixture.

Films formed from the interpolymerizable mixtures, even those containing an emulsifying agent such as Triton–X–200 cure practically as quickly as those containing no water or emulsifying agent. The films formed seem to be just as hard, insoluble and resistant to discoloration as those in which water and emulsifying agents are omitted.

Example II

In accordance with this example, a series of samples of a pigmented paste was prepared as in Example I. In one sample, orthoamyl phenol was omitted. The mixture was catalyzed with the peroxide of methyl ethyl ketone in an amount of 1 milliliter, 60 percent active content form, per 50 grams of mixture. This example constituted a control.

To the second, third and fourth samples of the paste, water was added in amounts respectively of 1 percent, 2 percent and 3 percent (amounts are based upon the mixture). The pot lives in hours, cure times in minutes are tabulated as follows:

| Sample | Pot Life | Cure Time |
| --- | --- | --- |
| 1 (control) | 0.5 | 60 |
| 2 | 3.5 | 70 |
| 3 | 5.5 | 70 |
| 4 | 7.0 | 90 |

Apparently, about 2 to 5 percent of water constituted an optimum in the mixtures of these examples.

As previously indicated, various monomers containing >C=CH$_2$ groups may be employed in the interpolymerizable mixture in the preparation of coating compositions embodying the principles of the present invention. This is illustrated by the following example:

Example III

In this example, the styrene of Example I was replaced by vinyl toluene. The interpolymerizable mixture comprised:

| | Parts by weight |
| --- | --- |
| Polyester (as in Example I) | 130 |
| Vinyl toluene | 70 |
| Hydroquinone | 0.026 |
| Paraffin wax | 0.062 |
| Cobalt naphthanate | 1.2 |

In order to prepare the foregoing copolymerizable mixture, the polyester was melted and heated to 150° C., the hydroquinone was added and the mixture was cooled to 120° C. The vinyl toluene and wax were added and the mixture was cooled as rapidly as practicable, with exclusion of air, until room temperature was attained; then the cobalt naphthanate was added. To 50 grams of the foregoing interpolymerizable mixture was added 2 percent by weight of water and 1 milliliter of a sixty percent solution of the peroxide of methyl ethyl ketone in dimethyl phthalate. This mixture had a pot life of greater than 6 hours, and had a cure time of 85 minutes.

When the water content of the mixture was increased to 3 percent, the pot life was about 27 hours and films of the mixture cured in approximately 92 minutes.

When the vinyl toluene in the above mixture was replaced by styrene, the pot life of the mixture was 5½ hours with 2 percent of added water. The cure time of the films was 70 minutes. With 3 percent of added water the pot life was 7 hours and the cure time of the films was 90 minutes.

Example IV

In the example, a paste comprising equal parts of titanium dioxide and a vehicle comprising the following ingredients:

| | Parts by weight |
| --- | --- |
| Polyester (as per Example I) | 130 |
| Styrene | 70 |
| Hydroquinone | 0.026 |
| Paraffin wax | 0.0626 |
| Cobalt naphthanate | 1.2 |

To 123 grams of this mix was added 77 grams of a paste of finely divided calcium silicate and the above vehicle, the proportion of calcium silicate and vehicle being respectively 15 and 85 percent by weight. To the mixture was then added 313 parts by weight of the afore-mentioned vehicle. The mixture was divided into parts and to a 50 gram portion was added 3 milliliters of a mixture of a 60 percent solution of methyl ethyl ketone peroxide in dimethyl phthalate. This mixture, as will be observed, did not contain water and was employed as a control. The mixture had a pot life of 18 minutes at a temperature of 49° F. The pot life of the mixture obviously was very short, which would be a serious objection to practical use.

For purposes of comparison, to a second portion of 50 grams of the mixture was added 1½ grams of water and 3 milliliters of a catalyst mixture comprising a 60 percent solution of peroxide of methyl ethyl ketone in dimethyl phthalate. This mixture had a pot life of 8 hours, and films thereof, cured in 25 minutes at 49° F. This was a very practical coating material.

The use of water to retard gelation of the catalyzed polyester-monomer mixtures is not confined to coating compositions; but may also be extended to mixtures employed in impregnating and laminating as well as in casting and in other operations. The following examples illustrate this fact:

Example V

In this example, a polyester which was the product of reaction of propylene glycol and a mixture of equal moles of maleic acid and phthalic acid was prepared. The polyester in a ratio of 1 part by weight was mixed with 2 parts by weight of styrene. The mixture was stabilized with 0.1 percent by weight of trimethyl benzyl ammonium chloride and 0.001 percent of quinone.

The mixture was divided into two 100 gram samples and there were added as catalysts (A) 1 percent by weight based upon the mixture of a solution of 1 part by weight of cobalt naphthanate in 2 parts of styrene, and (B) a commercial catalyst known as Lupersol D. D. M. and which is understood to be a 60 percent solution of the peroxide of methyl ethyl ketone in dimethyl phthalate. One sample was employed as a control. To the second sample was added 3 percent by weight, based upon the resin mixture, of water. The samples were then introduced into containers. The control gelled in 5 minutes. The sample containing water gelled in 30 minutes. After the cans had stood for 2 days without application of heat, the Barcol hardnesses were respectively 45–49 and 10–25. The gel time of the mixture was obviously increased by the addition of water.

Example VI

This example constituted a repetition of Example V except that the catalyst was 1.5 percent by weight based upon the mixture of benzoyl peroxide. Cobalt naphthenate was omitted. The gel time of the control was 57 minutes, while the same containing 3 percent of water gelled in 5 hours and 10 minutes.

Example VII

The polyester of this example was the same as that of Example V except that the stabilizer was 0.0025 percent of hydroquinone cooked into the polyester. The polyester was incorporated with styrene as in Example V and two 100 gram samples were taken. The samples were catalyzed with 2 percent by weight of a mixture of (A) 1 part by weight of cobalt naphthenate in 2 parts by weight of styrene and (B) 2 percent by weight of D. D. M., mixture above described. One sample was employed as a control, the other was mixed with 3 percent by weight of water. The gel time of the control was 1 hour and 10 minutes. The gel time of the second was 5 hours and 10 minutes. After the mixtures had stood for 2 days, the Barcol hardnesses of the samples were respectively 45–49 and 30–45.

In Examples V through VII, the samples were baked for 1 hour at 250° F. The Barcol values of the samples all then fell within a range of 40–50. The mixtures containing water were suitable for use as casting resins.

The forms of the invention as herein described are to be regarded as being by way of illustration and not of limitation. It will be apparent to those skilled in the art that numerous modifications may be made therein without departure from the spirit of the invention or the scope of the appended claims.

I claim:

1. A resinous composition comprising a mixture of (A) a polyester of a dihydric alcohol and an alpha-beta ethylenically unsaturated dicarboxylic acid, (B) a monomer containing a $CH_2=C<$ group, the monomer being present in an amount of about 5 percent to 50 percent by weight based upon the polyester-monomer mixture, and (C) about 0.5 percent to 12 percent by weight of water based upon the total weight of said interpolymerizable components.

2. The resinous composition of claim 1 wherein the polyester further contains a dicarboxylic acid component which is free of ethylenic unsaturation.

3. A resinous composition comprising a mixture of (A) a polyester of a dihydric alcohol and an alpha-beta ethylenically unsaturated dicarboxylic acid, (B) a monomer containing a $CH_2=C<$ group, (C) about 0.5 percent to 12 percent of water by weight based on the total weight of said interpolymerizable components, and (D) a hydrocarbon wax.

4. The composition of claim 3 wherein the polyester component further contains a dicarboxylic acid component which is free of ethylenic unsaturation.

5. The composition of claim 4 wherein the wax is a paraffin wax.

6. The resinous composition of claim 5 wherein one component of the polyester is phthalic acid.

7. The resinous composition of claim 6 wherein the monomer is of a class consisting of styrene and vinyl toluene.

8. A method of increasing the pot life of a mixture of (A) a polyester of dihydric alcohol and an alpha ethylenic dicarboxylic acid, (B) a monomer containing a $>C=CH_2$ group, (C) a phenolic gelation inhibitor and (D) a free radical initiator, which comprises incorporating into the mixture 0.5 to 12 percent by weight of water based on the total weight of said polyester and monomer.

9. An interpolymerizable mixture comprising (A) a polyester of a dihydric alcohol and a dicarboxylic acid component at least a part of which is ethylenically unsaturated, (B) a monomer containing a $>C=CH_2$ group, (C) a phenolic gelation inhibitor effective during periods of storage, (D) a peroxidic catalyst of polymerization, and (E) 0.5 to 10 percent by weight of water based on the total weight of said polyester and monomer in dispersion in the mixture.

10. An interpolymerizable mixture as defined in claim 9 in which dicarboxylic acid component of the polyester is in part free of ethylenic groups.

11. In a method of preparing an interpolymer from a mixture of (A) a monomer containing a $>C=CH_2$ group and (B) a polyester of a dihydric alcohol and a dicarboxylic acid containing alpha-beta ethylenic unsaturation, the step of adding to said mixture a mixture of water, a peroxidic catalyst and an emulsifier.

12. The method defined in claim 11 in which the monomer is of a class consisting of vinyl toluene and styrene.

References Cited in the file of this patent

UNITED STATES PATENTS

| | | |
|---|---|---|
| 1,967,220 | Barrett et al. | July 24, 1934 |
| 2,403,791 | D'Alelio | July 9, 1946 |
| 2,443,735 | Kropa | June 22, 1948 |
| 2,631,137 | Loritsch et al. | Mar. 10, 1953 |

UNITED STATES PATENT OFFICE
CERTIFICATE OF CORRECTION

Patent No. 2,843,556

July 15, 1958

Robert W. Moorman

It is hereby certified that error appears in the printed specification of the above numbered patent requiring correction and that the said Letters Patent should read as corrected below.

Column 8, line 42, for "Trion-" read -- Triton- --; column 10, line 45, for "same" read -- sample --.

Signed and sealed this 24th day of March 1959.

(SEAL)
Attest:

KARL H. AXLINE
Attesting Officer

ROBERT C. WATSON
Commissioner of Patents